Nov. 19, 1935.  B. W. TWYMAN  2,021,706
POWER STEERING
Filed May 22, 1933
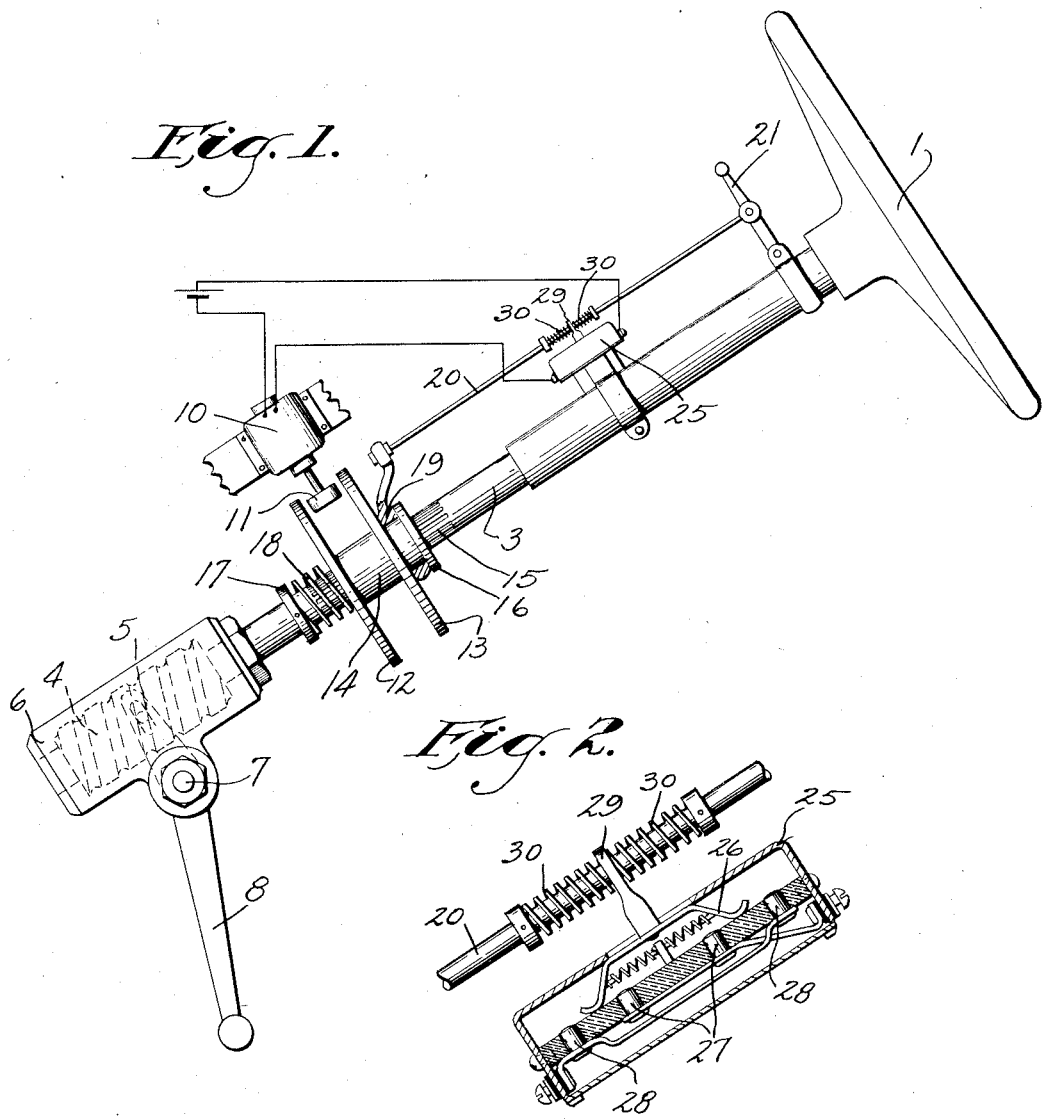
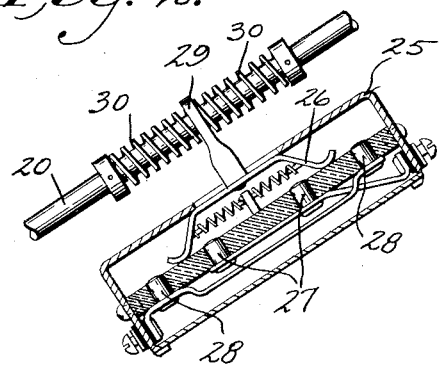
INVENTOR
B. Wickliffe Twyman
BY
ATTORNEYS Patented Nov. 19, 1935

2,021,706

UNITED STATES PATENT OFFICE 2,021,706

POWER STEERING

B. Wickliffe Twyman, Milwaukee, Wis., assignor to Lavine Gear Company, Milwaukee, Wis., a corporation of Wisconsin Application May 22, 1933, Serial No. 672,114

7 Claims. (Cl. 180—79.1)

This invention relates to improvements in power steering.

It is the object of the invention to provide a novel and improved means for applying power in the steering of an automotive vehicle, such means being simpler, more effective, more economical, and more easily installed than devices heretofore used for the purpose.

It is my further purpose to provide an auxiliary power device for operating a steering gear in which the power will be applied to the steering shaft through means making a maximum mechanical advantage available to the prime mover.

It is also my object to provide an auxiliary power operated device for actuating steering gears under a control preferably independently of the customary steering wheel, this being a factor which not only makes for simplicity of the apparatus, but greatly facilitates its installation upon the existing steering gears.

In the drawing:

Figure 1 is a view diagrammatically illustrating the application of the invention to a steering gear mechanism shown in side elevation.

Figure 2 is a detail view in longitudinal section, of a switch which may serve the purposes of the diagrammatic illustration in Figure 1.

Like parts are identified by the same reference characters throughout the several views.

It is one of the features of the present invention that the steering gear mechanism proper is entirely of conventional design and the motion of the steering wheel 1 is transmitted through the usual steering shaft 3 to the conventional worm cam 4 and nut sector 5 in the steering gear casing 6, the motion of the nut sector being transmitted through a rock shaft 7 to the steering arm 8. A part of the steering shaft is enclosed in the usual shaft housing 9.

The prime mover 10 may comprise an electric motor. It drives a friction roller 11 disposed between the inner peripheral portions of a pair of spaced friction plates 12 and 13 carried on a hub 14 which is axially reciprocable on the splines 15 of the steering shaft 3 and is extended and flanged at 16 to provide a conventional shifting collar.

Seating against a collar 17 fixed to the steering shaft, is a compression spring 18 of sufficient length to maintain the pair of driven friction disks 12 and 13 approximately centered in spaced relation to the driving friction wheel 11. In order to provide some means of selectively engaging the driving member 11 with either of the driven disks 12 or 13, the necessary relative movement is provided for by bodily shifting the driven disks upon the steering shaft 3 through the medium of a fork 19 actuated by a rod 20. The rod engages disk 12 with the driving wheel 11 by lifting the assembly against gravity, and it engages disk 13 of the driving wheel by pushing the assembly down against the compression of spring 18. The rod 20 is manipulated by any desired type of handle 21, the word "handle" being used generically to cover any operating part.

In order that the electric motor need not be in continuous operation, I prefer to provide at 25 a switch having a moving contact 26, live contacts 27, and motor connected contacts 28, the actuator 29 of the switch being mounted on the rod 20 between a pair of springs 30 in such a way that the initial movement of rod 20 in either direction will close the circuit to the electric motor, the rod being free to move such additional distance as is necessary to engage the friction clutch to rotate the steering shaft in the appropriate direction. It will be obvious that the steering shaft will rotate in opposite directions according to whether disk 12 or 13 is engaged with the drive roller 11.

The construction disclosed has the advantage of extreme simplicity, and at the same time is so effective that a small electric motor operated from the ordinary starting and lighting battery of the vehicle will serve to turn the front wheels even with the vehicle at rest. A big mechanical advantage is secured by reason of the size of the driving roller 11 with respect to the driven disks 12 and 13 and, moreover, the power is applied in such a way that advantage is taken of the reduction in the steering gear itself. Since the prime mover is electrically driven it is not necessary to the operation of the device that the vehicle motor must be in operation. Thus, the wheels of a parked vehicle may be turned in preparation for leaving the curb before the engine of the vehicle is set in motion.

The apparatus is so simple and so easily applied to a conventional steering gear that it may readily be installed even in existing motor vehicles to supplement the normal manual control of steering. It is particularly noteworthy that the steering wheel remains operative at all times and is not rendered to any degree ineffective when steering is done by power. If the power of the electric motor is overcome by force applied to the steering wheel, or if the electric motor is allowed to remain in operation too long after the dirigible wheels of the vehicle have reached their limit of movement, the friction drive will simply slip without damage of any kind to the mechanism.

I claim:

1. The combination with a steering shaft provided with manually operable means made fast thereto for its actuation, of a prime mover provided with a control independent of said means and selectively alternatively available for the power actuation of said shaft in either direction, a driving rotor connected with said prime mover, a pair of driven rotors, and means for selectively rendering said prime mover effective for the rotation of said shaft alternatively in either direction according to the driven rotor through which motion is transmitted from the driving rotor to the shaft.

2. The combination with a steering shaft provided with manually operable means for its actuation, of a prime mover selectively alternatively available for the power actuation of said shaft in either direction, a driving rotor connected with said prime mover, a pair of driven rotors connected with the shaft, and rotor-engaging means manually operable independently of said shaft for selectively rendering said prime mover effective for the rotation of said shaft alternatively in either direction according to the driven rotor through which motion is transmitted from the driving rotor to the shaft, said rotor-engaging means including a control device effective upon the initial movement of said rotor-engaging means to render said prime mover operative.

3. The combination with a steering shaft, of a pair of friction disks spaced thereon, a motor provided with a driving rotor interposed between said disks and normally free thereof, said driving rotor having its axis transverse to that of said steering shaft, and means for producing relative movement between said rotor and disks to engage a predetermined disk with said rotor for the selective operation of said shaft from said motor through either of said disks.

4. The combination with a steering shaft, of a pair of friction disks spaced thereon, a motor provided with a driving rotor interposed between said disks, normally free thereof, and having its axis transverse to that of said shaft, and means for producing relative movement between said rotor and disks to engage a predetermined disk with said rotor for the selective operation of said shaft from said motor through either of said disks, and motor control means adapted to energize and de-energize said motor and operatively connected with said first mentioned means to energize said motor preliminary to the engagement of either of said disks with said rotor.

5. The combination with a steering gear including a driving shaft, reduction gearing, and a driven rock shaft, of an auxiliary power operated device for the actuation of said driving shaft, said device including a motor, a driving rotor connected with said motor and a pair of driven rotors rotatively fixed with said shaft, said driving rotor having its axis transverse to said shaft and being alternatively engageable with one or the other of said driven rotors for driving said shaft in either direction, and means independent of said shaft for controlling the application of motive power thereto, the driving force of said motor being effective on said rock shaft through the reduction gearing in said steering gear, said shaft being normally free to rotate unimpeded by said motor.

6. In a device of the character described, the combination with a steering gear including a driving shaft provided with a wheel, of a pair of spaced friction drive plates mounted on said shaft, an electric motor having a power delivering rotor interposed between said plates in driving relation therewith and having its axis transverse to that of said shaft, means normally maintaining said plates disengaged from said rotor, and manually operated means for producing relative movement between said rotor and plates whereby selectively to engage one of said plates with said rotor, and to operate said shaft in a direction dependent upon the plate engaged therewith.

7. In a device of the character described, the combination with a steering shaft and steering wheel thereon, of a friction disk set splined to said shaft intermediate the ends thereof and comprising spaced disks, means for supporting said set in a predetermined axial position upon said shaft, a relatively fixed motor having a driving wheel interposed between the disks of said set, and means for bodily moving said set axially of the shaft for the selective engagement of either disk with said wheel.

B. WICKLIFFE TWYMAN.